United States Patent [19]

Toshev et al.

[11] 4,171,345

[45] Oct. 16, 1979

[54] METHOD OF MANUFACTURE OF REINFORCING CARBON BLACK

[75] Inventors: Vassil S. Toshev; Yordan G. Patov; Emilia I. Angelova, all of Sofia, Bulgaria

[73] Assignee: Vish Chimiko-Technologicheski Institute, Sofia, Bulgaria

[21] Appl. No.: 819,146

[22] Filed: Jul. 26, 1977

[51] Int. Cl.² .................... C07C 3/00; C07C 5/00; C07C 11/02
[52] U.S. Cl. .................... 423/450; 423/449; 585/241
[58] Field of Search .................... 423/449, 450; 260/683 PD

[56] References Cited

U.S. PATENT DOCUMENTS

| | | | |
|---|---|---|---|
| 3,132,926 | 5/1964 | Ruble | 423/450 |
| 3,674,433 | 7/1972 | Wyatt | 423/450 |
| 3,772,242 | 11/1973 | Liska et al. | 423/449 X |
| 3,823,221 | 7/1974 | Wakefield et al. | 423/449 |
| 3,823,223 | 7/1974 | Liska et al. | 423/449 X |
| 3,978,199 | 8/1976 | Maruhnic et al. | 423/449 X |

*Primary Examiner*—O. R. Vertiz
*Assistant Examiner*—Gregory A. Heller
*Attorney, Agent, or Firm*—Karl F. Ross

[57] ABSTRACT

A method for the production of carbon black which comprises the steps of pyrolyzing at a temperature range of from 250° C. to 950° C., a composition consisting of 0 to 100% scrap vulcanized rubber, 0 to 70% particulate and yarn polymeric resin wastes, and 0 to 50% coke-production, petroleum-refining and petrochemical-derived hydrocarbons to form a mixture of volatile products; recovering and condensing from the products a fraction of cyclic hydrocarbons having a correlation index in excess of 90; and injecting said cyclic hydrocarbon fraction as the feedstock to a carbon-black generating burner to form carbon black.

3 Claims, No Drawings

METHOD OF MANUFACTURE OF REINFORCING CARBON BLACK

FIELD OF THE INVENTION

The invention relates to a method of obtaining reinforcing carbon black, useful in rubber compositions for other purposes.

BACKGROUND OF THE INVENTION

To obtain liquid feedstocks for oil furnace processing to make carbon black, the world-wide practice is to use certain petroleum fractions and extracts and coal tar distillates of a wide range of compositions and properties. For that purpose, special kinds of petroleum oil having specific hydrocarbon composition are selected. The resources of such highly-aromatic raw-materials however, are fairly limited, thus requiring the exploration for new sources.

There is a known method of obtaining carbon black directly from fine-milled/or ground rubber wastes through their destruction in a special reactor, where the black, gases and coke-like residuals are obtained (see USSR Authorship Certificate No. 328 605; Bull. Izobr., 32/1972). The black obtained in accordance with this method, has a considerable content of coke-particles and ash, as well as a lower oil number and other deviations from the standards for this types of black. When used in rubber compositions poor performances of these vulcanizates were just obtained.

In another well-known method, fine-milled rubber wastes are added to feedstock oil for the production of furnace black ("Polymer Age", vol. 3, No. 7, July 1972, p. 237; U.S. Pat. No. 3,674,433 of July 4th, 1972; U.S. Pat. No. 3,700,615 of October 1972). The drawback of this method is that fine milling/or grinding of the scrap rubber is required, with associated high power consumption. The quality of carbon black is substantially affected by the high-ash content of the rubber particles.

An object of this invention is the elaboration of a method of obtaining reinforcing furnace carbon blacks, lamp blacks and thermal carbon blacks, from easily accessible or waste materials, by a thermal destruction-/or break-down.

THE INVENTION

This problem is solved by the following way:

A blend which for example comprises from 0–100% of scrap rubber vulcanizates such as tires, rubber conveyor belts, footwear, cable insulations and all sort of production wastes, from the rubber industry; from 0 to 70% of wastematerials from plastics, synthetic resins, yarns and textiles, and from 0 to 50% of other hydrocarbons as coal tars, extracts from the selective refining of mineral oils, goudrons, semi-goudrons and other remainders from the petroleum-refining processes and petrochemical synthesis is subjected to destructive distillation (pyrolysis).

The pyrolytic thermal break-down is carried out in a reactor at a temperature in the range of 250° to 950° C.

The released vapor and gas mixture is passed through a condensing, water cooled (18° C.) system, and results in the delivery of liquid hydrocarbons and gases, while the reactor contains only a solid, coke-like residue.

When necessary, and in order to increase the rate of aromatization of the obtained liquid hydrocarbons (correlation-index = over 90) the vapor and gas mixture from the products of the thermal break-down may be submitted to a further heat treatment in another reactor, at 400° to 900° C.

From the liquid-product of the thermally broken-down of a blend of waste polymers and other materials are obtained—by means of the distillation, extraction etc.—fractions and extracts containing a considerable amount of nuclear aromatic hydrocarbons with boiling range of 200° to 500° C. (the mean boiling temperature being not higher than 390° C.) which can serve as feedstock—independently, or in blends with other liquid feedstock—for the production of reinforcing furnace black, lamp block and thermal blacks by the well-known methods utilizing conventional turbulent flame carbon black burners.

The advantages of the method according to the invention are as follows:

1. The starting materials, are easily accessible waste-materials.
2. By means of blend and temperature-control it is possible to obtain feedstock with desired properties, ensuring a high yield of good black.
3. The equipment is not sophisticated and the same processes of treatment the starting materials and obtaining the black are easily feasible.
4. There is a considerable broadening of liquid hydrocarbon resources, suitable for the obtaining of carbon black.
5. The feedstock and the resulting carbon black are obtained at low cost.
6. The waste materials and products are efficiently used.

For a better illustration of invention's essentials the following examples are cited:

EXAMPLE 1

To a thermal break-down is submitted a charge constituted of whole split truck scrap tires. The process is carried out in a reactor of a 5 liters capacity and for a running time of 4½ hours. The charge is heated to 600° C. by means of a gradual temperature-rise in the reactor. The vapor and gas mixture, containing the break-down products is deflected from the reactor and submitted to a further thermal treatment at 680° to 700° C. in another reactor, and passed through a water-cooled condenser in order to separate the condensible hydrocarbons in the form of an overall product.

By means of fractional distillation of the overall product, fractions are separated with the following features: density at 20° C.—0.993; refractive index 1.5976; distillation range—initial boiling point 280° C., 50% distillating up to 362° C.; sulphur content 0.98%; correlation index 92.

The fraction is fed, for the obtaining of furnace carbon black, into a turbulent flame, being mixed (1:1) with oil. The black has the following basic characteristics specific surface—82.4 $m^2/g$; oil number—92 ml/100 gr.

EXAMPLE 2

To a thermal break-down, according to Example 1, is subjected a blend comprising scrap truck tires, waste polystyrene, pyroliz resin and coal tar pitch in a 3:1:2:2.5 ratio of mass parts respectively.

The liquid product of the thermal break-down, after condensing the vapor and gas mixture, is further submitted to a fractional distillation, wherein for the carbon black production is separated a fraction with following features: density at 20° C.—1.026; refractive index at 20°

C.—1.6122; distillation range—initial boiling point 253° C., and 50% distillating up to 371° C.; sulphur content 0.97% mass; correlation index 93.

The black, obtained from a 1:1 mixture of the resulting fraction with oil has the following features: specific surface 86.3 m²/g; oil number=108 ml/100 g.

EXAMPLE 3

From the liquid-hydrocarbon fraction, obtained in accordance with example 2, and by means of furfural-extraction, an extract serving as a feedstock for carbon black is obtained. The process is carried out in an continuous-action extraction apparatus, where the disaerated material as fed to the bottom, and the furfural to the upper part of the column. The solution is distilled in order to separed the furfural which is thereafter regenerated.

The so obtained residual extract features a density at 20° C. 1.041; a refractive index of 1.634; distillation range—initial boiling point 250° C., 50% distillating up to 386° C.; sulphur content 1.4 mass %; correlation index—106.

The furnace black, obtained from a 1:1 mixture of the extract with oil has the following features: specific surface—97.2 m²/g; oil number 115 ml/100 g.

What we claim is:

1. A method for the production of carbon black which comprises the steps of
   (a) pyrolyzing at a temperature range of from 250° C. to 950° C., a composition consisting of 0 to 100% scrap vulcanized rubber, 0 to 70% particulate and yarn polymeric resin wastes, and 0 to 50% coke-production, petroleum-refining and petrochemical-derived hydrocarbons to form a mixture of volatile products;
   (b) heating said volatile products to a temperature in the range 400° C. to 900° C.;
   (c) thereafter recovering and condensing from said products a fraction of cyclic hydrocarbons having a correlation index in excess of 90 and mean boiling temperature not higher than 390° C. and a boiling range of 200° C. to 500° C.; and
   (d) injecting said cyclic hydrocarbon fraction as a substantial portion of the feedstock in admixture with other carbon black feedstock to a carbon-black generating burner to form carbon black.

2. The method according to claim 1 wherein the recovery of the cyclic hydrocarbon fraction is by fractional distillation.

3. The method according to claim 1 wherein the recovery of the cyclic hydrocarbon fraction is a solvent extraction separation and said solvent is furfural.

* * * * *